(12) United States Patent
Dominguez et al.

(10) Patent No.: US 9,449,199 B2
(45) Date of Patent: Sep. 20, 2016

(54) FEATURE ENABLEMENT WITHIN A PRINTER

(75) Inventors: Pablo Dominguez, Barcelona (ES); Luis Alberto Hernando, Barcelona (ES); Sebastia Cortes, Barcelona (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1709 days.

(21) Appl. No.: 12/836,642

(22) Filed: Jul. 15, 2010

(65) Prior Publication Data

US 2012/0013934 A1 Jan. 19, 2012

(51) Int. Cl.
*G06F 15/00* (2006.01)
*G06F 21/84* (2013.01)

(52) U.S. Cl.
CPC .................................... *G06F 21/84* (2013.01)

(58) Field of Classification Search
USPC ............................................... 358/1.14, 1.15
See application file for complete search history.

(56) References Cited

U.S. PATENT DOCUMENTS

| | | | |
|---|---|---|---|
| 7,363,507 B2* | 4/2008 | Rick | G06F 21/121 705/51 |
| 2003/0142335 A1* | 7/2003 | Oleinik | G06F 3/1206 358/1.13 |
| 2004/0120001 A1* | 6/2004 | Boldon | G06F 8/66 358/1.15 |
| 2007/0273643 A1 | 11/2007 | Erez et al. | |
| 2008/0133418 A1 | 6/2008 | Lehmann et al. | |
| 2008/0181650 A1* | 7/2008 | Matsui | G03G 15/5066 399/80 |
| 2008/0235512 A1* | 9/2008 | Minagawa | G06F 21/608 713/171 |
| 2010/0046781 A1 | 2/2010 | Chen | |

OTHER PUBLICATIONS

"Professional Dongle Emulator for Popular Hardware Keys"; http://www.dongleservice.com/dongle-emulator.phtml; (pp. 1-2).
"Sequencher"; http://www.genesearch.com.au/ra_gc_prices.php; (pp. 1-2).
"HP Designjet T7XX printer series" TT PS Upgrade Flier Version 2; May 2009; (pp. 1-84).

* cited by examiner

*Primary Examiner* — Andrew H Lam
(74) *Attorney, Agent, or Firm* — Dicke, Billig & Czaja PLLC (57) ABSTRACT

In one embodiment, an apparatus that removably connects to a first printer is validated, the validating including comparing first data stored within the apparatus to second data stored within the first printer. A first feature is enabled within the first printer utilizing third data stored within the apparatus. The apparatus is restricted such that the apparatus is no longer operable to enable the first feature within a printer other than the first printer.

20 Claims, 6 Drawing Sheets

FEATURE ENABLEMENT WITHIN A PRINTER

BACKGROUND

For customer convenience and to allow for efficient customization, printers are sometimes supplied with firmware that contains both active features and hibernated features. As used in this specification and the appended claims, a "hibernated feature" is a feature that does not function unless subsequently enabled utilizing an authorized code or key. In some circumstances, authorization of a hibernated feature occurs when a user enters a specific access code via a user interface. For example, a user may be asked to enter an access code or key via a printer touchpad, or via an interface for a connected computer such as a keyboard or mouse. In other circumstances, an apparatus that contains a code or key may be connected to the printer, the apparatus enabling the hibernated feature for so long as the apparatus is connected to the printer.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

DETAILED DESCRIPTION OF EMBODIMENTS

An apparatus that enables a feature in a printer can be configured such that the apparatus can be easily detached and reused amongst a specified set of printers, e.g. printers of certain model numbers, to enable a feature while the apparatus is attached to the printer. In certain environments, however, an enabling device that remains connected to the printer may not be the best solution as due to concerns that the apparatus will be lost or stolen. Embodiments described below were developed in an effort to effectively control a feature within a printer in a manner that allows for the authorizing apparatus to be disconnected from the printer and that restricts the apparatus' ability to enable the feature other printers.

The following description is broken into sections. The first, labeled "Environment", describes an example environment in which embodiments may be implemented. The second section, labeled "Components", describes various physical and logical components utilized to implement various embodiments. The third section, labeled as "Operation", describes steps taken to implement various embodiments. The fourth section, labeled "Example", describes an example implementation of a connector and an apparatus utilized in enabling a feature within a printer.

Environment

Figure 1:
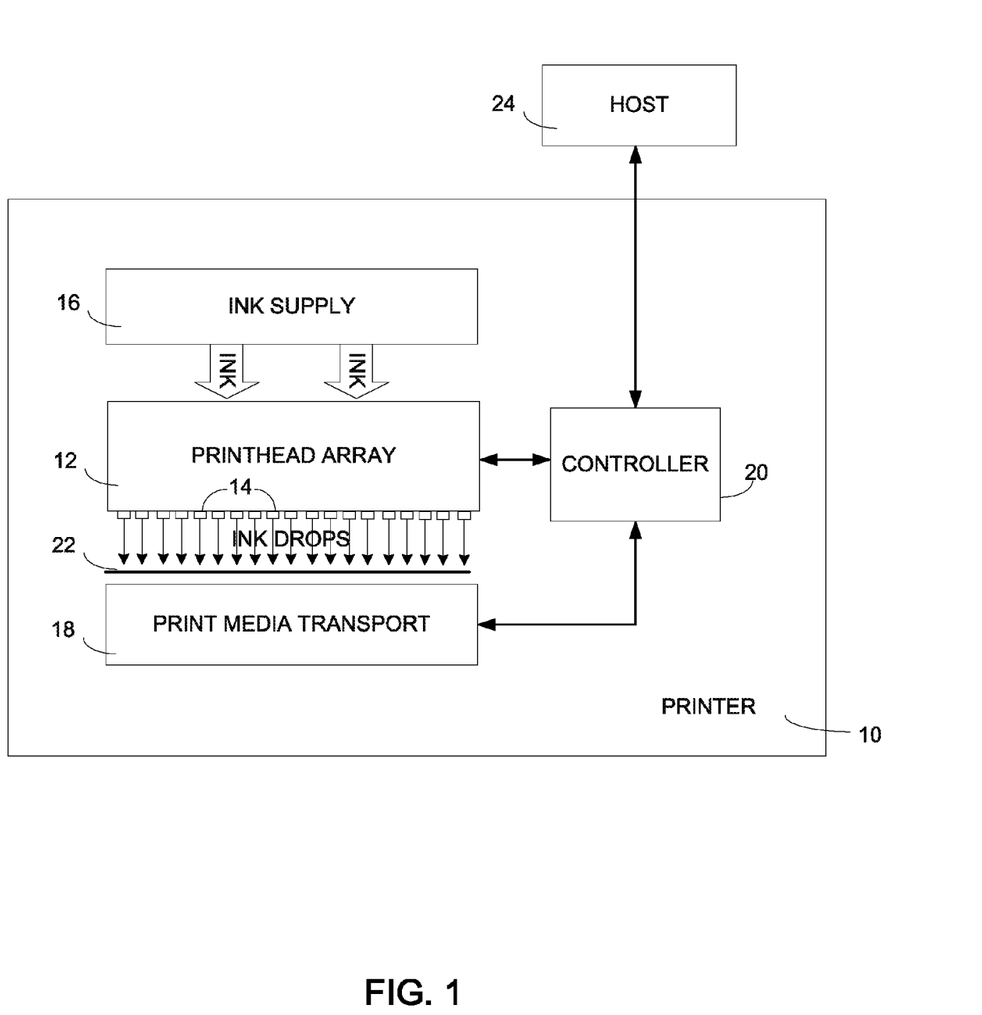
FIG. 1 is a block diagram illustrating one embodiment of an inkjet printer.

FIG. 1 is a block diagram illustrating an inkjet printer 10 that includes an array 12 of printheads 14, an ink supply 16, a print media transport system 18 and an electronic printer controller 20. Printer 10 illustrates one example of an environment for implementing embodiments of the new method and system to enable a feature within a printer. Printhead array 12 in FIG. 1 represents generally one or more printheads 14 and the associated mechanical and electrical components for ejecting drops of ink or other marking material on to a sheet or continuous web of paper or other print media 22. As used in this specification and the appended claims, a "print media" is an object that can be printed upon. "Print media" and "media" are used synonymously in this application. In operation, printer controller 20 selectively energizes the ink ejector elements in a printhead, or group of printheads, in the appropriate sequence to eject ink on to media 22 in a pattern corresponding to the desired printed image.

Printhead array 12 and ink supply 16 may be housed together as a single unit or they may comprise separate units. Printhead array 12 may be a mostly stationary, larger unit (with or without supply 16) spanning the width of print media 22. Alternatively, printhead array 12 may be a smaller unit that is scanned back and forth across the width of media 22 on a moveable carriage. Media transport system 18 advances print media 22 lengthwise past printhead array 12. For a stationary printhead array 12, media transport 18 may advance media 22 continuously past the array 12. For a scanning printhead array 12, media transport 18 may advance media 22 incrementally past array 12, stopping as each swath is printed and then advancing media 22 for printing the next swath. Controller 20 may receive print data from a computer or other host device 24 and, when necessary, process that data into printer control information and image data. Controller 20 controls the movement of the operative components of media transport system 18. And, as noted above, controller 20 is electrically connected to printhead array 12 to energize the printhead ejector elements to eject ink drops on to media 22. By coordinating the relative position of array 12 and media 22 with the ejection of ink drops, controller 20 produces the desired image on media 22 according to the print data received from host device 24.

Components

Figure 2:
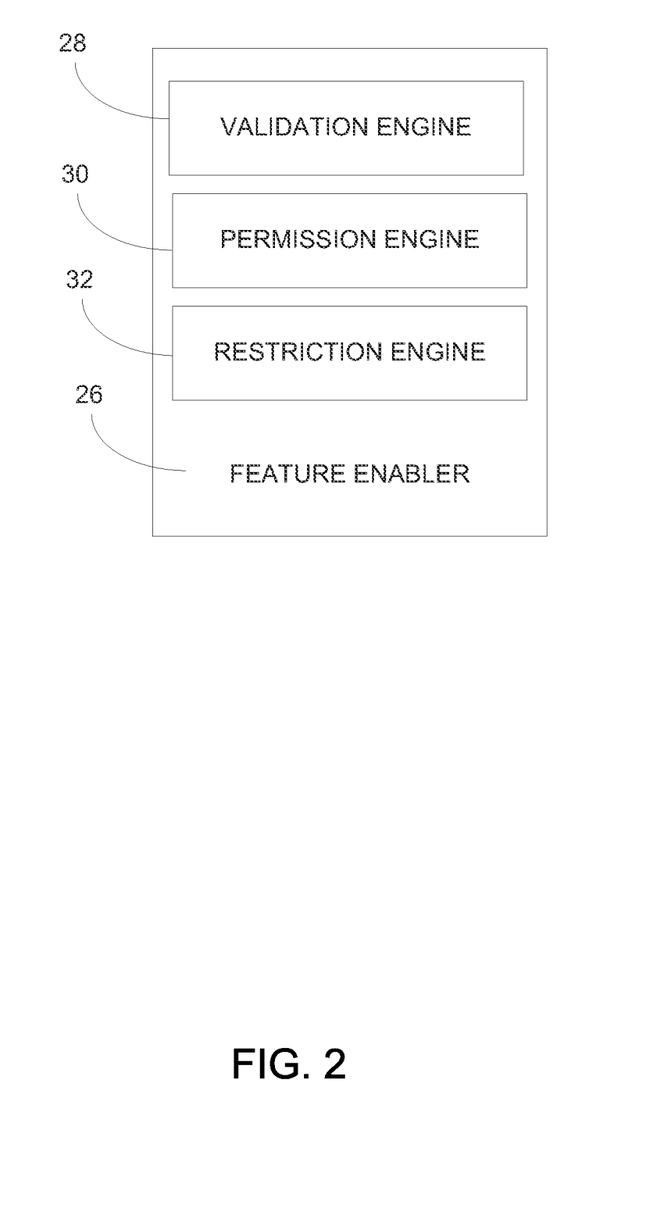
FIG. 2 depicts an example feature enabler according to an embodiment.

FIG. 2 depicts an example of a feature enabler 26. Feature enabler 26 represents generally any combination of hardware and programming configured for use in controlling a feature within a printer. In the example of FIG. 2, feature enabler 26 is shown to include a validation engine 28, a permission engine 30 and a restriction engine 32.

Validation engine 28 represents generally any combination of hardware and programming configured to validate an apparatus that removably connects to a first printer, the validating including comparing first data stored within the apparatus to second data stored within the first printer. In an embodiment, each of the first data and the second data includes a proprietary code that identifies the apparatus as a device that is authorized for use with the first printer. In an embodiment, validation engine 28 is additionally configured to revalidate the apparatus upon a reconnection of the apparatus with the first printer. As used in this specification and the appended claims, a "reconnection of the apparatus with the first printer" means a new connection of the apparatus with the first printer after the apparatus is disconnected from the printer. Such reconnection may occur after the apparatus is disconnected from the first printer for storage or safekeeping.

Permission engine 30 represents generally any combination of hardware and programming configured to enable the first feature within the first printer utilizing third data stored within the apparatus. In an embodiment, the third data serves as key to unlock the feature and includes a proprietary code. In an embodiment, the third data includes the first data. In one embodiment, the third data that is the same as the first data stored within the apparatus and used during validating of the apparatus. In an embodiment, enabling the first feature may include copying the third data from the apparatus to the printer, the third data serving as a key to unlock the feature within the printer. In an embodiment, enabling the first feature may include moving the third data from the apparatus to the printer, the third data serving as a key to unlock the feature within the printer.

In an embodiment, the first feature that is enabled utilizing the apparatus includes an addition to a second feature, the second feature already enabled within the first printer. In an embodiment, the first feature includes a memory addition to increase the total memory available in the first printer. In an embodiment, the first feature includes a page description language ("PDL") that is an add-on to an existing PDL already enabled within the printer. As used in this specification and the appended claims, a "page description language" or "PDL" is a language or format that describes a page's text and graphical content for print and/or screen. Examples of PDLs include, but are not limited to, HPGL/1 (Hewlett-Packard Graphics Language 1), HPGL/2 (Hewlett-Packard Graphics Language 2), PostScript, PDF (Portable Document Format), JPEG (Joint Photographic Experts Group standard), TIFF (Tagged Image File Format), PCL3 (Printer Command Language 3) and PJL (Printer Job Language). An example of enabling a feature that is an addition to a feature already enabled within the printer is to unlock hibernating HPGL/2 functionality within a printer that already has PostScript functionality. After this addition a printer may process documents that are formatted in HPGL/2 as well as documents that are formatted in PostScript.

In an embodiment, the first feature that is enabled utilizing the apparatus includes an upgrade to a second feature, the second feature already enabled within the first printer. In an embodiment, the first feature includes a memory upgrade. In an embodiment, the first feature includes a PDL that is an upgrade to an existing PDL already enabled within the printer. An example of enabling a feature that is an upgrade to a feature already enabled within the printer is to unlock hibernating HPGL/2 functionality within a printer that already has activated HPGL/1 functionality.

In an embodiment, permission engine 30 is additionally configured to disable the enabled first feature after a reconnection and a revalidation of the apparatus. Such reconnection may occur after the apparatus is disconnected from the first printer for storage or safekeeping. In an embodiment, disabling occurs after the first printer accesses memory within the apparatus and recognizes that the apparatus holds printer-identifying fourth data that matches or corresponds with the printer-identifying fourth data held in memory within the first printer. (The fourth data is discussed in detail at paragraph [00018] of this application). In this embodiment, recognition or identification of the fourth data in the apparatus indicates to the printer that the apparatus is being reconnected, and is a signal to the first printer to disable the first feature within the first printer. In an embodiment, the presence of the fourth data in the apparatus upon reconnection of the apparatus prompts the first printer to send a message via a user interface, the message requesting confirmation that a user intends to disable the feature.

Restriction engine 32 represents generally any combination of hardware and programming configured to restrict the apparatus such that the apparatus is no longer operable to enable the first feature within a printer other than the first printer. In an embodiment, restricting the apparatus comprises storing fourth data within the apparatus, the fourth data identifying the first printer. In an embodiment, the fourth data includes the first printer's serial number. In this embodiment, the apparatus is not capable of being utilized to enable the feature in any printer other than the first printer for so long as the first printer's serial number resides within the apparatus. In another embodiment, the fourth data includes the first printer's part number. In an embodiment, the fourth data includes the first printer's part number and serial number. In an embodiment, storing fourth data within the apparatus may include copying the fourth data from the printer to the apparatus, the fourth data serving as a lock to prevent the apparatus from being used to enable the feature in printers other than the first printer. In an embodiment, storing fourth data within the apparatus may include moving the fourth data from the printer to the apparatus, the fourth data serving as a lock to prevent the apparatus from being used to enable the feature in printers other than the first printer.

In an embodiment, restriction engine 32 is additionally configured to unrestrict the apparatus such that the apparatus is again operable to enable the first feature within a printer other than the first printer. As used in this specification and the appended claims, to "unrestrict" means to negate, cancel or remove a restriction. Unrestricting of the apparatus may occur after revalidating of the apparatus, revalidating occurring upon reconnection of the apparatus with the first printer, and after disabling of the first feature in the first printer. In an example, reconnection of the apparatus with the first printer may occur after the apparatus is disconnected from the first printer for storage or safekeeping. In an embodiment, unrestricting the apparatus includes removing the fourth data from the apparatus. In an embodiment, unrestricting the apparatus comprises moving the fourth data from the apparatus to the first printer. In an embodiment, unrestricting the apparatus comprises deleting the fourth data from the apparatus.

Figure 3:
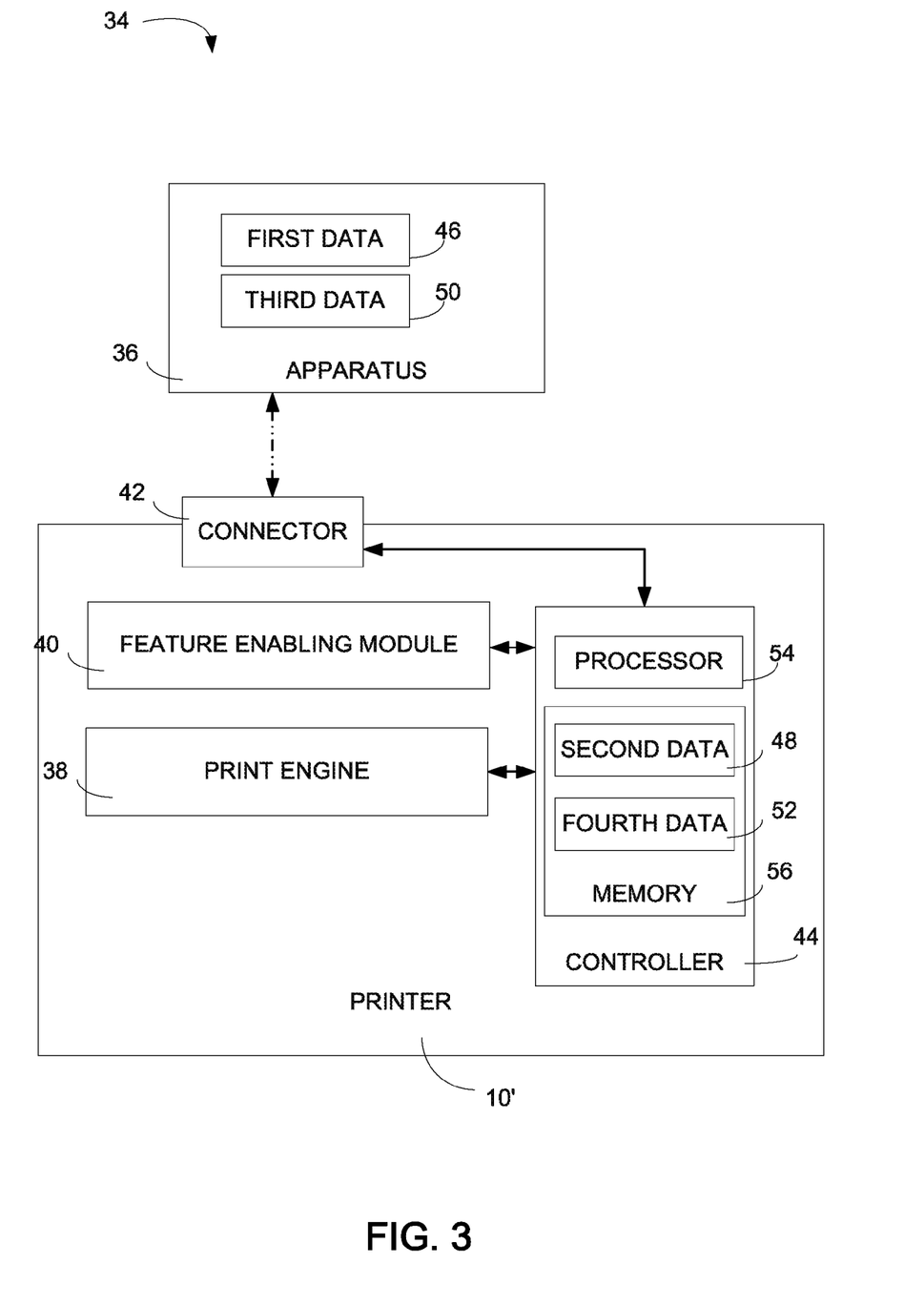
FIG. 3 depicts an implementation of the feature enabler of FIG. 2 according to an embodiment.

Feature enabler 26 may be implemented in a number of environments, such as environment 34 of FIG. 3. Environment 34 includes a first printer 10', and an apparatus 36. First printer 10' includes a print engine 38, a feature enabling module 40, a connector 42 and a controller 44. Print engine 38 represents generally any combination of hardware and programming capable of transporting media through first printer 10' and forming desired images on the media (22, FIG. 1). In an embodiment, print engine 38 includes an array 12 of printheads 14, an ink supply 16, and a print media transport 18 (FIG. 1).

Connector 42 represents generally any combination of hardware and programming included within first printer 10' that is capable of removably connecting to apparatus 36, and facilitating an exchange of data between a memory 56 included within first printer 10' and apparatus 36. In an embodiment connector 42 includes a Universal Serial Bus (USB) port. In embodiments, connector 42 may include a serial port, parallel port or other port or docking device to connect, and enable data transfer between, printer 10' and apparatus 36.

Apparatus 36 represents generally any combination of hardware and programming capable of removably connecting to first printer 10' via connector 42. Apparatus 36 is additionally capable of storing data and exchanging data with first printer 10'. In an embodiment, apparatus 36 comprises a non-volatile computer storage technology that can be electrically erased and reprogrammed. In an embodiment apparatus 36 comprises flash memory. In an embodiment apparatus 36 comprises non-flash EEPROM (electrically-erasable programmable read-only memory).

Feature enabling module 40 represents generally any programming, that, when executed by controller 44, implements the functionality of the feature enabler of FIG. 2. In particular, feature enabling module 40, when executed by controller 44, is responsible for validating apparatus 36, the validating including comparing a first data 46 stored within the apparatus to a second data 48 stored within first printer 10'. A first feature is enabled within first printer 10' utilizing third data 50 stored within apparatus 36. In an embodiment, the third data 50 that serves as a key to unlock the feature is the same as the first data 46 stored within apparatus 36 and used during validating of apparatus 36. Apparatus 36 is restricted such that apparatus 36 is no longer operable to enable the first feature within a printer other than first printer 10'. In an embodiment, restricting apparatus 36 comprises storing fourth data 52 within apparatus 36, the fourth data 52 identifying first printer 10'. In an embodiment, the fourth data 52 includes the serial number of first printer 10'. In this embodiment, apparatus 36 is not capable of being utilized to enable the feature in any printer other than the first printer for so long as the first printer's serial number resides within apparatus 36. In an embodiment, the fourth data 52 includes the part number and serial number of first printer 10'. In an embodiment, feature enabling module 40, when executed by controller 44, is additionally responsible for revalidating apparatus 36, disabling the first feature, and unrestricting apparatus 36 (such that apparatus 36 is operable to enable the first feature within a printer other than first printer 10') upon a reconnection of the apparatus with the first printer. Such reconnection may occur after the apparatus is disconnected from the first printer for storage or safekeeping.

As used in this specification, controller 44 represents generally any combination of elements capable of coordinating the operation of components 38 and 40. In a given implementation, the controller 44 includes a processor 54 and a memory 56. The processor 54 may represent multiple processors, and the memory 56 may represent multiple memories. In embodiments, memory 56 may comprise RAM (random access memory), ROM (read only memory), PROM (programmable read-only memory), EPROM (erasable programmable read-only memory), and/or EEPROM (electrically erasable programmable read-only memory). In an embodiment, the controller 44 may include a number of software components that are stored in a computer-readable medium, such as memory 56, and are executable by processor 54. In this respect, the term "executable" includes a program file that is in a form that can be directly (e.g. machine code) or indirectly (e.g. source code that is to be compiled) performed by the processor 54. An executable program may be stored in any portion or component of memory 56.

In the foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Operation

Figure 4:
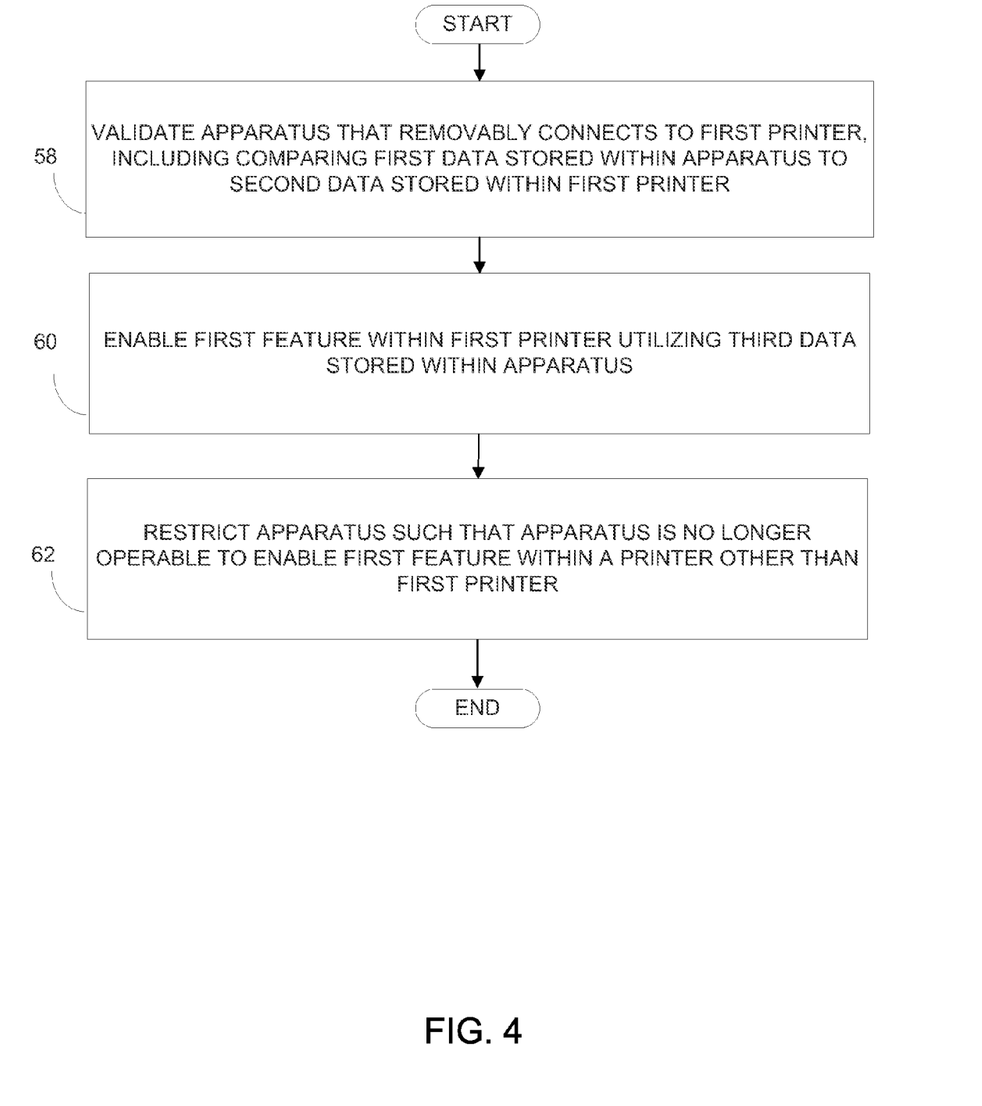
FIGS. 4-5 are flow diagrams depicting steps taken to implement various embodiments.
Figure 5:
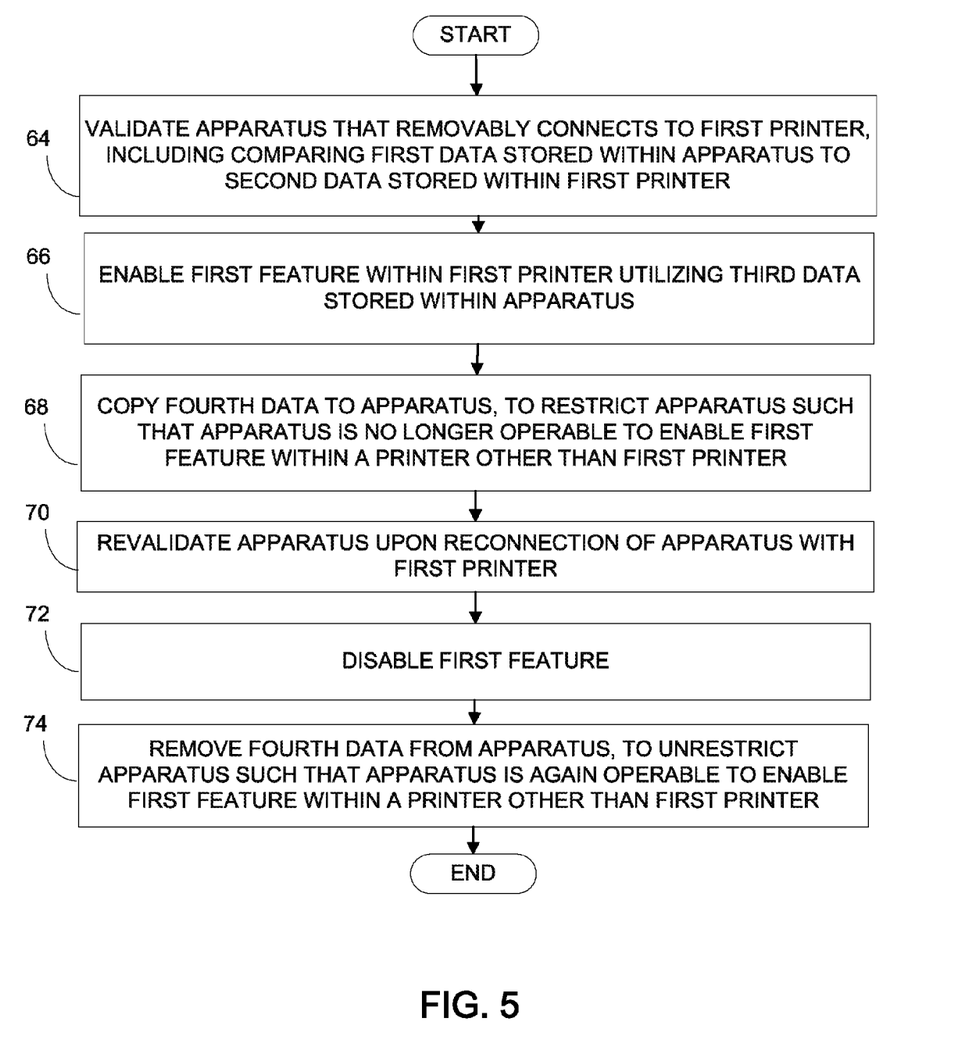

FIGS. 4 and 5 are example flow diagrams of steps taken to implement a method to control a first feature within printers, in accordance with an embodiment. In discussing FIGS. 4 and 5, reference may be made to the diagrams of FIGS. 1-3 to provide contextual examples. Implementation, however, is not limited to those examples.

Starting with FIG. 4, an apparatus that removably connects to a first printer is validated, the validating including comparing first data stored within the apparatus to second data stored within the first printer (block 58). Referring back to FIG. 2, validation engine 28 may be responsible for implementing block 58. In an embodiment, each of the first data and the second data includes a proprietary code that identifies the apparatus as a device that is authorized for use with the first printer.

Continuing with the flow diagram of FIG. 4, the first feature within the first printer is enabled utilizing third data stored within the apparatus (block 60). Referring back to FIG. 2, permission engine 30 may be responsible for implementing block 60. In an embodiment, enabling the first feature may include copying the third data from the apparatus to the printer, the third data serving as a key to unlock the feature within the printer. In an embodiment, enabling the first feature may include moving the third data from the apparatus to the printer, the third data serving as a key to unlock the feature within the printer. In an embodiment, the third data that serves as key to unlock the feature includes the first data. In one embodiment, the third data that serves as a key to unlock the feature is the same as the first data stored within the apparatus and used during validating of the apparatus. In an embodiment, the first feature that is enabled utilizing the apparatus includes an addition to a second feature, the second feature already enabled within the first printer. In an embodiment, the first feature includes a memory addition. In an embodiment, the first feature includes a page description language ("PDL") that is an add-on to an existing PDL already enabled within the printer.

Continuing with the flow diagram of FIG. 4, the apparatus is restricted such that the apparatus is no longer operable to enable the first feature within a printer other than the first printer (block 62). Referring back to FIG. 2, restriction engine 32 may be responsible for implementing block 62. In an embodiment, restricting the apparatus comprises storing fourth data within the apparatus, the fourth data identifying the first printer. In an embodiment, the fourth data includes the first printer's serial number. In this embodiment, the apparatus is not capable of being utilized to enable the feature in any printer other than the first printer for so long as the first printer's serial number resides within the apparatus. In an embodiment, storing fourth data within the apparatus may include moving the fourth data from the printer to the apparatus, the fourth data serving as a lock to prevent the apparatus from being used to enable the feature in printers other than the first printer.

Moving on to FIG. 5, in a particular implementation, an apparatus that removably connects to a first printer is validated, the validating including comparing first data stored within the apparatus to second data stored within the first printer (block 64). Referring back to FIG. 2, validation engine 28 may be responsible for implementing block 64.

Continuing with the flow diagram of FIG. 5, the first feature within the first printer is enabled utilizing third data stored within the apparatus (block 66). Referring back to FIG. 2, permission engine 30 may be responsible for implementing block 66. In an embodiment, the first feature includes an upgrade to a second feature, the second feature already enabled within the first printer. In an embodiment, the first feature includes a memory upgrade. In an embodiment, the first feature includes a PDL that is an upgrade to an existing PDL already enabled within the printer.

Continuing with the flow diagram of FIG. 5, fourth data is copied from the first printer to the apparatus, to restrict the apparatus such that the apparatus is no longer operable to enable the first feature within a printer other than the first printer (block 68). Referring back to FIG. 2, restriction engine 32 may be responsible for implementing block 68. In another embodiment, the fourth data includes the first printer's part number. In an embodiment, the fourth data includes the first printer's part number and serial number.

Continuing with the flow diagram of FIG. 5, the apparatus is revalidated upon a reconnection of the apparatus with the first printer (block 70). Referring back to FIG. 2, validation engine 28 may be responsible for implementing block 70. In an example, reconnection of the first printer with the apparatus may occur at some point after the apparatus is disconnected from the first printer for storage or safekeeping following enablement of the first feature.

Continuing with the flow diagram of FIG. 5, the first feature is disabled (block 72). Referring back to FIG. 2, permission engine 30 may be responsible for implementing block 72. In an embodiment, disabling occurs after the first printer accesses memory within the apparatus and identifies that the apparatus holds printer-identifying fourth data that matches or corresponds with the printer-identifying fourth data held in memory within the first printer. Such identification of the fourth data in the apparatus indicates to the printer that the apparatus is being reconnected, and is a signal to the first printer to disable the first feature within the first printer.

Continuing with the flow diagram of FIG. 5, the fourth data is removed from apparatus, to unrestrict the apparatus such that the apparatus is again operable to enable the first feature within a printer other than the first printer (block 74). Referring back to FIG. 2, restriction engine 32 may be responsible for implementing block 74. In an example, reconnection of the first printer with the apparatus may occur at some point after the apparatus is disconnected from the first printer for storage or safekeeping following enablement of the first feature. In an embodiment, removing the fourth data from the apparatus comprises moving the fourth data from the apparatus to the first printer. In an embodiment, removing the fourth data from the apparatus comprises deleting the fourth data from the apparatus.

Example

Figure 6:
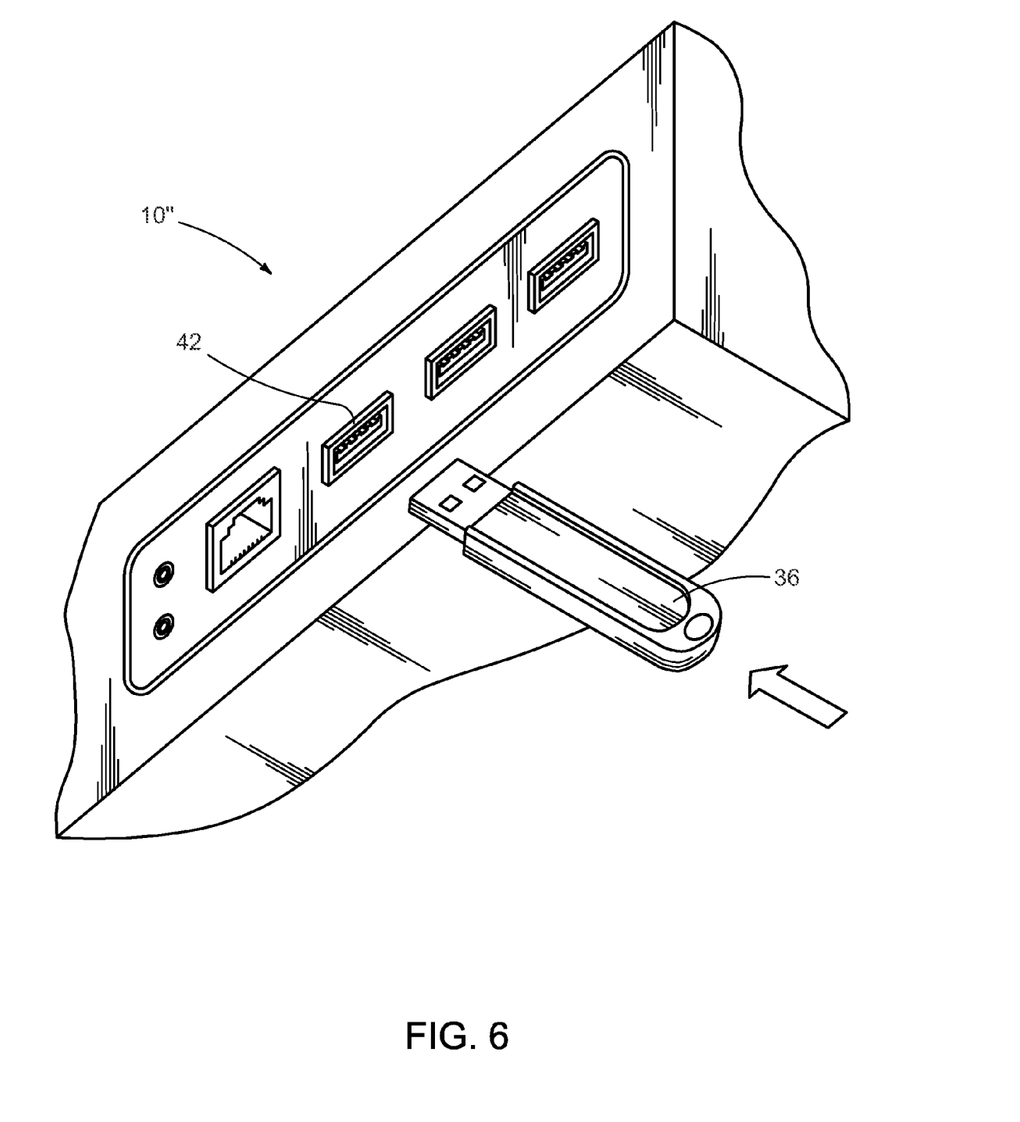
FIG. 6 depicts an example implementation of a connector and an apparatus utilized in enabling a feature within a printer.

The diagram of FIG. 6 provides an example implementation of a printer 10" that includes a connector 42, the connector to removably connect to an apparatus 36 and to facilitate an exchange of data between memory comprised within the printer 10" and the apparatus 36. In this embodiment the connector 42 comprises a USB port, and the apparatus 36 comprises a USB flash memory device. In an embodiment, the printer 10" includes a plurality of connectors, each of which is capable of removably connecting to the apparatus 36 to facilitate an exchange of data between memory comprised within the printer 10" and the apparatus 36. In embodiments, exchange of data comprises utilization, accessing, copying, and/or moving of data.

Conclusion

The diagram of FIG. 1 is used to depict an example environment in which various embodiments may be implemented. Implementation, however, is not so limited. FIGS. 2-6 show the architecture, functionality, and operation of various embodiments. Various components illustrated in FIGS. 2-6 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 4-5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A non-transitory computer readable medium storing computer executable instructions that when executed implement a method to control a first feature, the method comprising:
   validating an apparatus that removably connects to a first printer, the validating including comparing first data stored within the apparatus to second data stored within the first printer;
   enabling the first feature within the first printer utilizing third data stored within the apparatus; and
   restricting the apparatus such that, with the apparatus disconnected from the first printer, the apparatus is no longer operable to enable the first feature within a second printer.

2. The medium of claim 1, wherein the first and second data identify the apparatus as authorized for use with the first printer.

3. The medium of claim 1, wherein restricting the apparatus comprises storing fourth data within the apparatus, the fourth data identifying the first printer.

4. The medium of claim 1, wherein, with the apparatus disconnected from the first printer, the first feature remains enabled within the first printer.

5. The medium of claim 1, wherein the first feature comprises an addition to a second feature, the second feature already enabled within the first printer.

6. The medium of claim 1, wherein the first feature comprises a memory addition.

7. The medium of claim 1, wherein the first feature comprises a page description language addition.

8. The medium of claim 3, wherein the fourth data comprises the first printer's serial number.

9. The medium of claim 8, wherein the fourth data additionally comprises the first printer's part number.

10. The medium of claim 1, further comprising:
revalidating the apparatus upon a reconnection of the apparatus with the first printer;
disabling the first feature upon the reconnection; and
unrestricting the apparatus upon the reconnection such that the apparatus is again operable to enable the first feature.

11. The medium of claim 10, wherein restricting the apparatus comprises storing fourth data within the apparatus, the fourth data identifying the first printer, and wherein unrestricting the apparatus comprises removing the fourth data from the apparatus.

12. A first printer, comprising:
a memory;
a connector to removably connect to an apparatus and to facilitate an exchange of data between the memory and the apparatus;
a validation engine, operable to validate the apparatus when the apparatus is connected to the connector, the validating including comparing first data stored within the apparatus to second data stored within the memory;
a permission engine, operable to enable a first feature within the first printer utilizing third data stored within the apparatus; and
a restriction engine, operable to send fourth data to the apparatus, to restrict the apparatus such that, when the apparatus is disconnected from the first printer, the apparatus is no longer operable to enable the first feature within a second printer.

13. The first printer of claim 12, wherein the connector comprises a USB port.

14. The first printer of claim 12, wherein, when the apparatus is disconnected from the first printer, the first feature of the first printer remains enabled.

15. The first printer of claim 12, wherein the first feature comprises a memory upgrade.

16. The first printer of claim 12, wherein the first feature comprises a page description language upgrade.

17. The first printer of claim 12, wherein the fourth data comprises the first printer's serial number.

18. The first printer of claim 12, wherein, upon a reconnection of the apparatus with the first printer:
the validation engine is additionally configured to revalidate the apparatus;
the permission engine is additionally configured to disable the first feature; and
the restriction engine is additionally configured to unrestrict the apparatus.

19. The first printer of claim 18, wherein unrestricting the apparatus comprises removing the fourth data from the apparatus.

20. A method to control a first feature within printers, the method comprising:
validating an apparatus that removably connects to a first printer, the validating including comparing first data stored within the apparatus to second data stored within the first printer;
enabling the first feature within the first printer utilizing third data stored within the apparatus;
restricting the apparatus such that, upon disconnection of the apparatus from the first printer, the apparatus is no longer operable to enable the first feature within a second printer, the restricting including storing within the apparatus fourth data identifying the first printer;
revalidating the apparatus upon a reconnection of the apparatus with the first printer;
disabling the first feature within the first printer upon the reconnection; and
unrestricting the apparatus upon the reconnection such that the apparatus is again operable to enable the first feature, the unrestricting including removing the fourth data from the apparatus.

* * * * *